(12) United States Patent
Prati et al.

(10) Patent No.: US 8,468,240 B2
(45) Date of Patent: Jun. 18, 2013

(54) LOCATING NETWORK RESOURCES

(75) Inventors: Rodrigo Prati, Porto Alegre (BR); Deny Azzolin, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 12/881,975

(22) Filed: Sep. 14, 2010

(65) Prior Publication Data

US 2012/0066374 A1 Mar. 15, 2012

(51) Int. Cl.
*G06F 15/16* (2006.01)

(52) U.S. Cl.
USPC ............................................. 709/224; 725/35

(58) Field of Classification Search
USPC ................. 709/224, 225, 229; 725/35, 54, 59
See application file for complete search history.

(56) References Cited

U.S. PATENT DOCUMENTS

| | | | | |
|---|---|---|---|---|
| 6,996,611 B1 * | 2/2006 | Muto | ............................. | 709/223 |
| 7,051,095 B1 * | 5/2006 | Cantwell | ........................ | 709/223 |
| 7,941,458 B2 * | 5/2011 | Torr | ............................... | 707/802 |
| 7,945,573 B1 * | 5/2011 | Barnes et al. | .................. | 707/756 |
| 8,126,904 B1 * | 2/2012 | Bettinger et al. | ............. | 707/758 |
| 2003/0078987 A1 * | 4/2003 | Serebrennikov | .............. | 709/217 |
| 2004/0125401 A1 | 7/2004 | Earl et al. | | |
| 2004/0203439 A1 * | 10/2004 | Zerressen | ................... | 455/67.11 |
| 2005/0111856 A1 * | 5/2005 | Kawai | ............................... | 399/8 |
| 2007/0088814 A1 * | 4/2007 | Torii | ............................... | 709/223 |
| 2008/0072254 A1 * | 3/2008 | Jung et al. | ........................ | 725/39 |
| 2008/0132252 A1 | 6/2008 | Altman et al. | | |
| 2009/0177381 A1 * | 7/2009 | Taniguchi et al. | ............ | 701/208 |
| 2009/0216912 A1 | 8/2009 | Lee et al. | | |
| 2010/0169003 A1 | 7/2010 | Van Der Meer | | |
| 2011/0271197 A1 * | 11/2011 | Jones et al. | .................... | 715/739 |

FOREIGN PATENT DOCUMENTS

| | | | | |
|---|---|---|---|---|
| EP | 1646037 A2 | * | 4/2006 | |
| EP | 1937007 A1 | * | 6/2008 | |
| FR | 2907620 A1 | * | 4/2008 | |
| WO | WO 2007112334 A2 | * | 10/2007 | |

* cited by examiner

*Primary Examiner* — Wing F Chan
*Assistant Examiner* — Kostas Katsikis
(74) *Attorney, Agent, or Firm* — Jack H. McKinney

(57) ABSTRACT

A method for locating network resources includes determining a distance between a client device and each of a plurality of network resources. For each of the network resources, a subset of a plurality of location tags is selected. The subset for a given network resource is selected according to the distance between the client device and that network resource. The method also includes, for each of the network resources, causing a display by the client device, of values for the subset of location tags selected for that network resource.

17 Claims, 4 Drawing Sheets

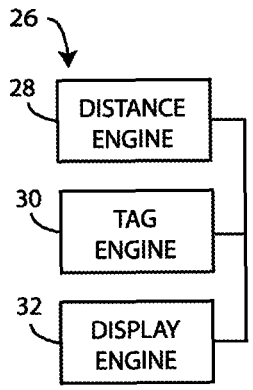
FIG. 2
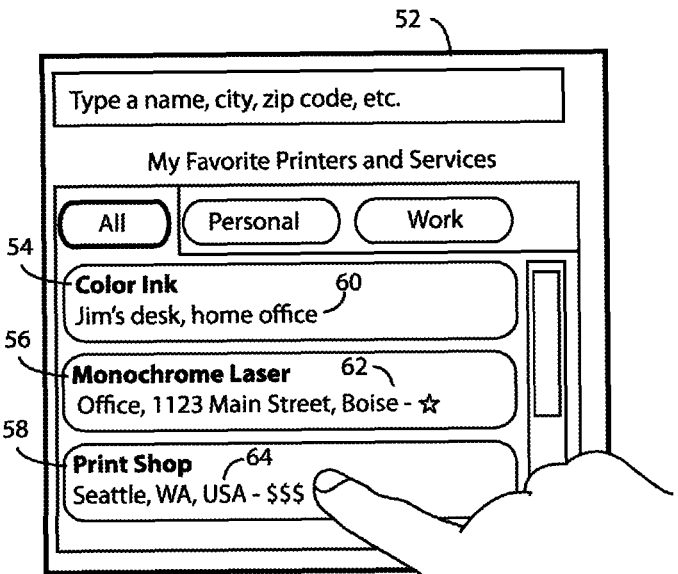
FIG. 3
FIG. 4
FIG. 5

LOCATING NETWORK RESOURCES

BACKGROUND

The actual use of a network resource such as a printer is typically preceded by the selection of that resource form a list of available services presented on a user interface. In mobile computing scenarios, user location is rarely static. This complicates the task of selecting an appropriate network resource. Viewing a user interface displayed on the mobile device, often a user cannot distinguish one network resource from another in a meaningful way. Even if data identifying the location of each network resource is presented, communicating excessive, contextually irrelevant information to the user can be as bad as or worse than presenting no location information.

DRAWINGS

FIG. 2 depicts a resource location system according to an embodiment.

FIGS. 3 and 4 depict tables according to embodiments.

FIG. 5 depicts an exemplary screen view in which, for each of a plurality of network resources, values for each subset of tags selected for that network resource are displayed according to an embodiment.

DETAILED DESCRIPTION

Introduction

Various embodiments described below were developed in an effort to cause a client device to display relevant information for use in locating a network resource. Relevance, in this case, is based on a distance between the client device and the network resource in question. When given the choice to select from among a number of available network resources such as printers, it can be important that the user be made aware of the physical locations of the network resources. This is especially true when the user is accessing the network service through a client device such as a smart phone. Such mobile devices, however, often have little room for displaying information identifying the location of a given resource. Thus, the information that is displayed should be relevant based on the distance between the mobile device and each network resource in question.

For example, when in the same room as a network resource, data identifying the location of that resource should be more detailed—"desk printer" for example. The user need not be made aware of location details such as floor, building, or city. When across town from a network resource, a street address at which the network resource is located is more relevant than the location of the resource within a room. Likewise, when in another city, the name of that city is more relevant than the network resource's street address or location within a room.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Environment

Figure 1:
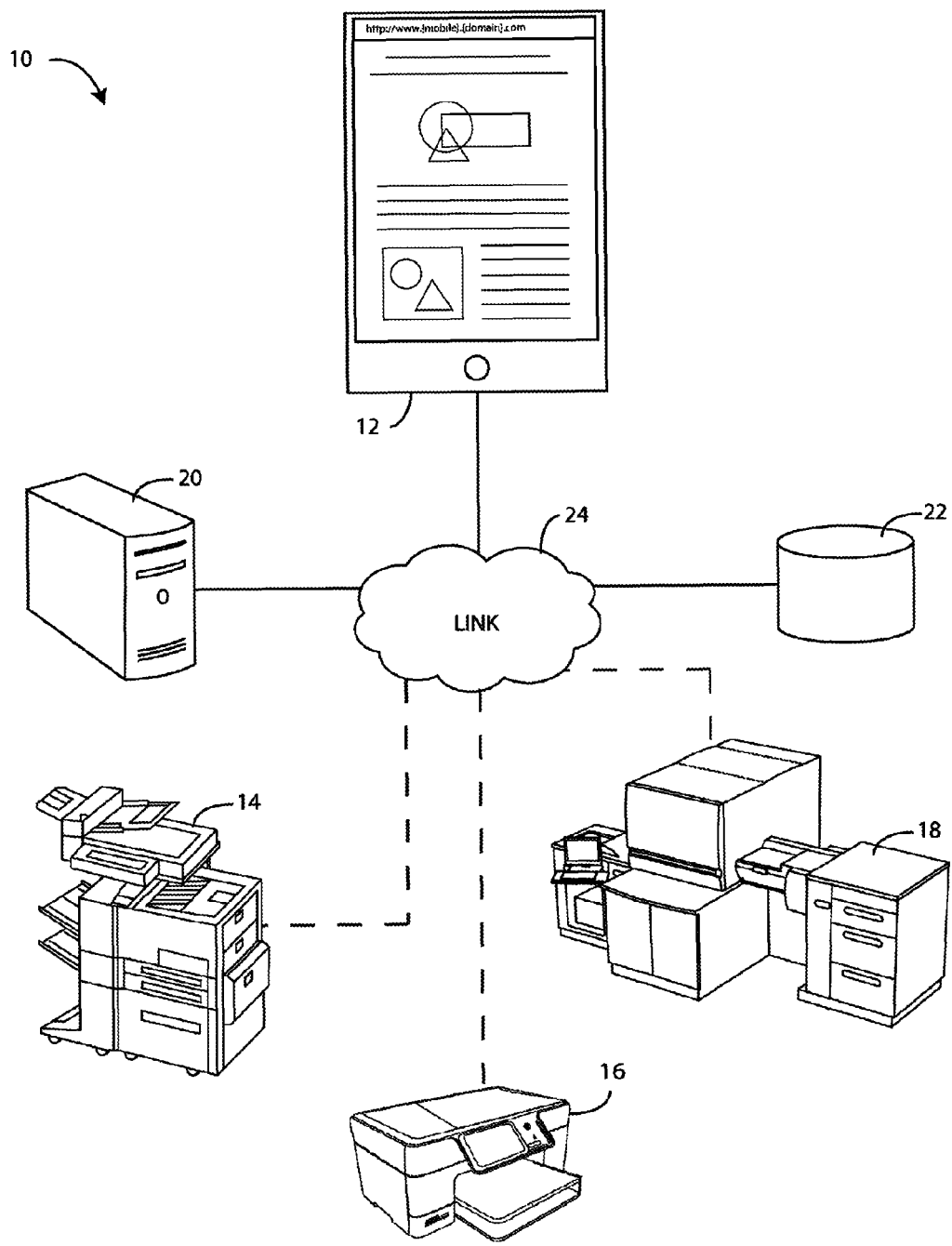
FIG. 1 depicts an environment in which various embodiments may be implemented.

FIG. 1 depicts an exemplary environment 10 in which various embodiments may be implemented. Environment 10 is shown to include client device 12, network resources 14-18, resource service 20, and data store 22. While environment 10 is shown to include one client device 12 and three network services, environment 10 may include any number of such components. While shown as printing devices, network resources 14, 16, and 18 may be or include any other type of resource capable of performing tasks at the direction of client device 12.

Client device 12 represents generally any computing device capable of network communication though which a user can select network resource 14, 16, or 18 for performing a particular task such as printing. Device 12 may be mobile in that it is configured to travel with a user. Examples include, but are not limited to, smart phones, laptops, net books, and the like. Network resources 14, 16, and 18 represent generally any devices or combination of devices configured to perform specified tasks at the direction of client device 12. In the example of FIG. 1, network resources 14, 16, and 18 are printer devices. Network resource 14 may be a monochrome laser printer located in an office. Network resource 16 may be a color ink printer located in a home, and network resource 18 may be a commercial printing system located in a commercial printing facility.

Resource service 20 represents generally a network service configured to aid client device 12 in locating and utilizing network resources 14, 16, and 18. A network service is a server or collection of servers configured to communicate with one or more devices to fulfill an intended purpose or purposes. In this case, that intended purpose is to communicate information to client device 12 that enables client device 12 to display information for locating network resources 14, 16, and 18. Data store 22 represents any device or collection of devices for storing data that can be accessed by resource service 20 and client device 12. Such data can include information for use in locating network resources 14, 16, and 18. Where network resources are printing devices, such data can also include printable content.

Components 12, 20, and 22 are interconnected via link 24. One or more of network resources 14, 16, and 18 may but need not be connected by link 24. Link 24 represents generally one or more of a cable, wireless, fiber optic, or remote connections via a telecommunication link, an infrared link, a radio frequency link, or any other connectors or systems that provide electronic communication. Link 24 may include, at least in part, an intranet, the Internet, or a combination of both. Link 24 may also include intermediate proxies, routers, switches, load balancers, and the like. The paths followed by link 24 between components 12-22 as depicted in FIG. 1 represent the logical communication paths between these devices, not necessarily the physical paths between the devices.

Components

FIG. 2 depicts various physical and logical components for implementing various embodiments. In particular, FIG. 2 depicts resource location system 26. System 26 includes distance engine 28, tag engine 30, and display engine 32. Referring back to FIG. 1, each component may be implemented on client device 12, resource service 20, or distributed across the two. Distance engine 28 represents generally any combination of hardware and programming configured to determine a distance between a client device and each of a plurality of network resources. Client devices such as smart phones include location services that can be used to dynamically identify a geographic location of the device. Network resources often have a known fixed or static location. A comparison of the device's location with the known location of each of the plurality of network resources can reveal the distances. Distance engine 28, when implemented on either client device 12 or resource service 20, may be responsible for executing the comparison to discern the distances. When implemented on client device 12, distance engine 28 may receive the distances from another source such as resource service 20.

Tag engine 30 represents generally any combination of hardware and programming configured to, for each of the network resources, select a subset of a plurality of location tags for that network resource. Those selections are made according to the determined distances between the client device and each of the network resources. Data associated with each of a series of location tags defines the location of a network resource. The location tags are common to all network services. However, each network resource has its own values for each of the location tags. As described below with respect to FIG. 3, a given location tag may call for a value identifying a country while another may call for a value identifying a particular room. Tag engine 30, then, may identify different subsets of the location tags for each network resource when the determined distances between the client device and those network resources differ.

Tag engine 30 may also be responsible for identifying attribute tags for each of the network resources. Resource attributes that need not be related to the location of a network resource can be defined through those attribute tags. For example, one an attribute tag may call for data indicative of a price for using a given network resource. Another attribute tag may call for data indicative of a network resource's popularity. Yet another may call for data relevant to a user's historical use of a network resource.

Display engine 32 represents generally any combination of hardware and programming configured to, for each of the network resources, cause a display by the client device of values for the subset of tags selected for that network resource. Display engine 32, when implemented on the client device, may function by directly causing the screen on the client device to display the particular values for each of the network resources. When implemented on resources service 20, display engine 32 may function by communicating those values to the client device with at least implicit instructions that they be displayed.

FIG. 3 depicts an example of a table 34 for use in defining the location of a network resource. As noted above, the location of each network resource can be identified by data associated with each of a series of location tags. Table 34 includes a series of location entries 36. Each entry 36 includes data in tag field 38 and associated data in value field 40. The value in tag field 38 of a given entry 36 represents a location tag. Each location tag corresponds to a different geographical scope—country, state, city, address, etc. The scope ranges from most geographically coarse to most geographically fine. In the example of FIG. 3, the most geographically coarse is "country" and the least is "reference" which corresponds to a user specifiable value such as "on the desk" or "by the window." In other words, the values of a more geographically coarse tag identifies a geographical territory while a value for a more geographically fine location tag identifies a position within that territory—a city within a state or a room within a building. Table 34 also includes a series of attribute entries 41. Each entry 41 has an attribute tag specified in field 38 and a corresponding value in value field 40. In this example, one attribute tag corresponds to price while another corresponds to popularity.

Referring back to FIG. 2, display engine 32 accesses table 34 to obtain the values to be displayed for the subset of location tags selected by tag engine 30 for a given network resource. Each network resource 14, 16, and 18 may have its own table 34. Alternatively, a single table may include entries having location tag values for multiple network resources. While, in this example, each location tag is depicted as a generic geographic descriptor—country, state, city, etc.— location tags can be of any of a number of other formats. Location tags could simply be numbers where, for example, "1" could represent country and "8" could represent room.

FIG. 4 depicts an example of a range table 42 for use in mapping a distance range to a subset of location tags. Range table 42 is shown to include a series of entries 44. Each entry 44 includes data in a range field 46, qualifier field 48, and tag subset field 50. Data in each range field 46 identifies a distance range corresponding to a distance between a client device and a network resource. The entries 44 span a nearest considered distance to a furthest considered distance. In the example of FIG. 4, distances are in meters with the nearest considered distance being less than five meters and the greatest considered distance being greater than five hundred thousand meters. Data in qualifier field 48 qualifies a corresponding distance range. Here those qualifiers range from very close to remote. Data in tag subset field 50 identifies the subset of location tags mapped to a corresponding distance range. In this example, each subset of location tags is a subset of the location tags identified in table 34 of FIG. 3. Looking at FIG. 4, a range corresponding to closer distances is associated with a subset of location tags whose values are more geographically fine. A range corresponding to a further distance is associated with a subset of location tags that are more geographically coarse.

Looking back to FIG. 2, tag engine 30, in the performance of its functions, may be responsible for generating or maintaining range table 42. Thus, in doing so, tag engine 30 is responsible for defining a sequential set of (n) distance ranges. Those ranges correspond to the values in the range field 46 of each entry 44. As previously noted, a first of the distance ranges includes a smallest considered distance and the (nth) distance range includes a largest considered distance. Tag engine 30 then associates each distance range with a different subset of location tags. Thus, when selecting a subset of location tags for each network resource, tag engine 30 accesses range table 42, identifies the entry 44 containing the distance range in which the determined distance between that network resource and the client device falls. Tag engine 30 then selects the subset of location tags associated with that distance range as specified in that entry 44.

FIG. 5 depicts an exemplary screen view of a user interface 52 caused to be displayed by a client device. User interface 52, in this example, is shown to include three user selectable controls 54, 56, and 58, each for choosing a different network resource. Control 54, for example, corresponds to network resource 16 of FIG. 1—a color inkjet printer. Control 56 corresponds to network resource 14 of FIG. 1—a monochrome laser printer. Control 58 corresponds to network resource 18 of FIG. 1—a commercial print shop. Each control 54, 56, and 58 is shown to include a location string 60, 62, and 64 that identifies a location of the corresponding network resource. Each location string is made up of values for each location tag in the subset of tags selected for a given network resource. A given location string can include additional information concerning attributes of a network resource. For example, location string 62 includes a star indicating that the given network resource is popular. Location string 64 includes dollar signs indicating that the particular network resource has a cost associated with its use.

Referring to FIG. 2, display engine 32 is responsible for causing the display of user interface 52 and thus location strings 60-64. In performance of this task, display engine 32 may acquire the location tag values for the subset of location tags selected by tag engine 30 for each network resource. Display engine 32 generates the location string 60, 62, and 64 for each network resource from the resource's acquired location tag values. In particular, for each network resource, display engine 32 may concatenate those location tag values to generate the location string for that network resource.

The real estate available for displaying information on a client device is often quite limited. Of note in FIG. 5, each location string 60, 62, and 64 is displayed as a single line. This accomplished, in part, by limiting the location data displayed for a given network resource to the pieces of information that are relevant for locating that resource. Again, relevance is based upon a distance between the client device and the given network resource; the shorter the distance the more specific the information. The network resource associated with control 54 is nearest as location string 60 identifies a desk within a room. Presumably, the client device is located within or near that room. The network resource associated with control 56 is further away as location string 62 identifies a building, an address, and a city. The network resource associated with control 58 is furthest away as location string identifies a city, state, and country.

Figure 6:
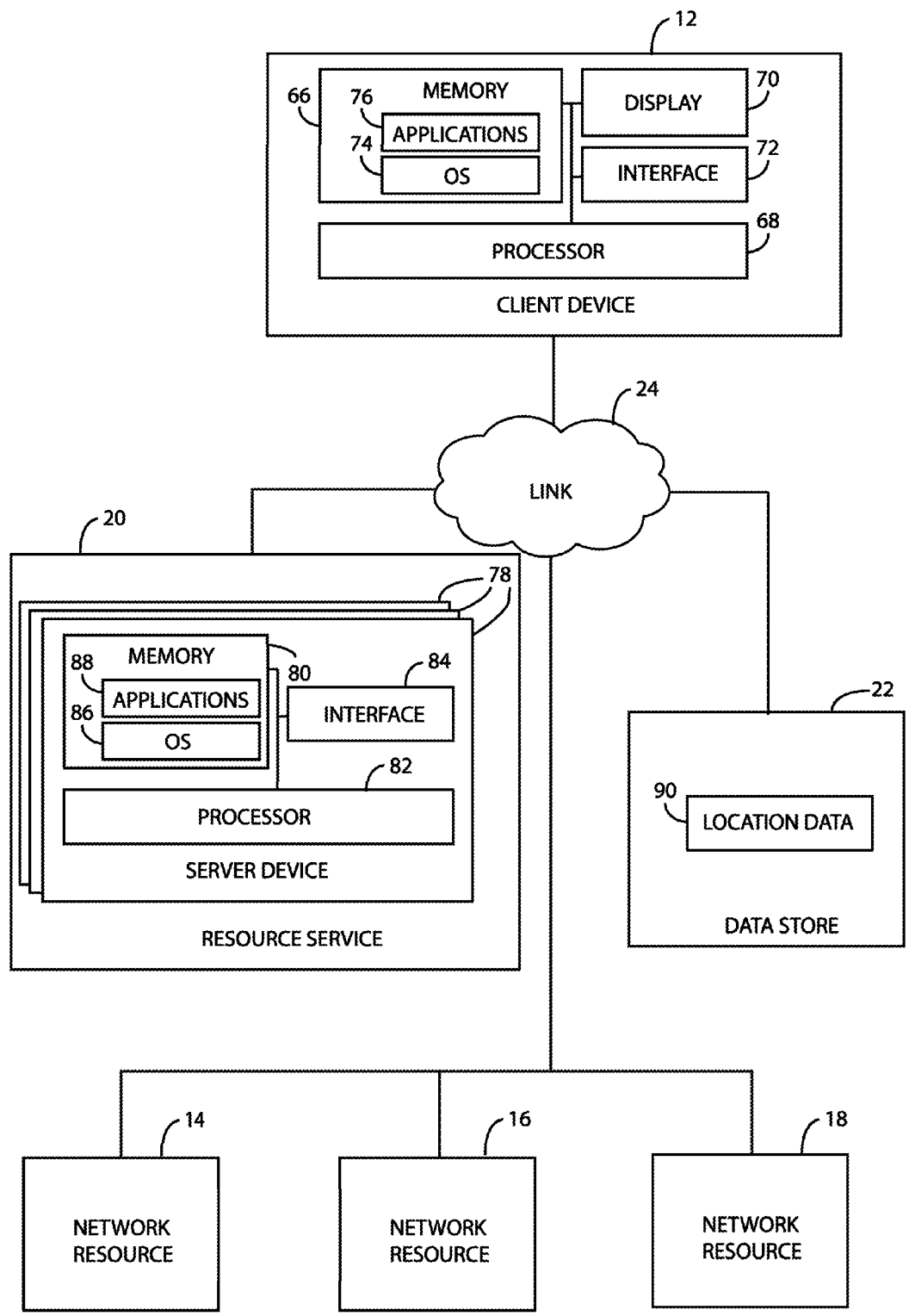
FIG. 6 is a block diagram depicting the physical and logical elements of a client device, resource service, and data store according to an embodiment.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media. Components operating on different devices, then, may utilize different processors and memory media. FIG. 6 helps illustrate.

FIG. 6 is a block diagram illustrating various elements of client device 12, resource service 20, and data store 22. Client device 12 is shown to include memory 66, processor 68, display 70, and interface 72. Processor 68 represents generally any processor configured to execute program instructions stored in memory 66 to perform various specified functions. Display 70 represents generally any display device capable of presenting a graphical user interface to a viewer. Display 70, for example, may be a touch screen responding to a viewer's touch to select user interface controls such as controls 54, 56, and 58 of FIG. 5. Interface 70 represents generally any wired or wireless interface enabling client device 12 to communicate via link 24.

Memory 66 is shown to include operating system 74 and applications 76. Operating system 74 represents a collection of programs that when executed by processor 68 serve as a platform on which applications 76 can run. Examples of operating systems include, but are not limited, to WebOS, mobile versions of Microsoft's Windows®, Linux®, and Android. Applications 76 represent program instructions for various functions of client device 12. Such instructions relate to functions such as web browsing, document viewing, and printing.

Resource service 20 is shown to include a number of server devices 78. Each server device includes memory 90, processor 82, and interface 84. Processor 82 represents generally any processor configured to execute program instructions stored in memory 80 to perform various specified functions. Interface 70 represents generally any wired or wireless interface enabling that server device 78 to communicate via link 24.

Memory is shown to include operating system 86 and applications 88. Operating system 86 represents a collection of programs that when executed by processor 82 serve as a platform on which applications 88 can run. Examples of operating systems include, but are not limited, server versions of Microsoft's Windows® and Linux®. Applications 76 represent program instructions for various functions of a given server device 78. Such instructions relate to functions such as assisting client device in accessing network resources 14-18. Such can include communicating data to client device 12 for use in locating network resources 14-18. Such can also include assisting client device 12 in communicating jobs to network resources 14-18. Where resources 14-18 are printing devices, such jobs can be print jobs.

Data store 22 is shown to include location data 90. Location data 90, for example, can include tables 34 for each network resource 14-18 or a common table for all resources 14-18. Location data 90 can include range table 42. Referring to FIG. 2, tag engine 30 can access range table 42 within data store 22 to identify the subset of location tags to be used for each network resource 14-18. Display engine 32 can then access table(s) 34 within data store 22 to obtain the values for each of those location tags.

Looking at FIG. 2, components 28-32 are described as combinations of hardware and programming. The hardware portions may, depending on the embodiment, be implemented as processor 68, processor 82, or a combination of both. The programming portions, depending on the embodiment can be implemented by operating system 74, applications 76, operating system 86, applications 88, or combinations thereof.

Operation

Figure 7:
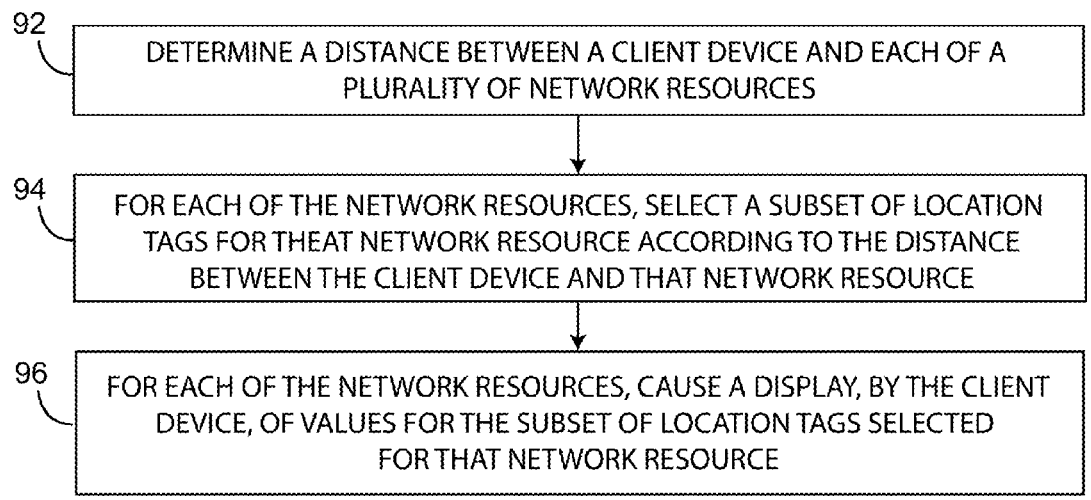
FIG. 7 is a flow diagram depicting steps taken to implement an embodiment.

FIG. 7 is an exemplary flow diagram of steps taken to implement an embodiment. In discussing FIG. 7, reference may be made to the diagrams of FIGS. 1-6 to provide contextual examples. Implementation, however, is not limited to those examples. Initially the distances between a client device and each of a plurality of network resources are determined (step 92). Step 92 can involve receiving the distances from another source or it can include calculating the distances based on known or estimated positions of the client device and the network resources. Referring to FIG. 2, distance engine 28 may be responsible for implementing step 92.

For each of the network resources, a subset of location tags are selected (step 94). The particular subset selected for a given network resource is chosen according to the determined distance between the client device and that network resource. Looking at FIG. 4, the subset of location tags can be identified using range table 42. Depending upon which range the distance between the client device and a given network resource falls, a different subset of location tags are selected. For each network resource a location tag is associated with a given value. Location tags can range is specificity from the most geographically coarse to the most geographically fine. The value for the most geographically coarse location tag identifies a territory, while the value for the most geographically fine location tag identifies a location within that territory such as a room in a building or a building within a city.

Referring to FIG. 2, tag engine 30 may be responsible for implementing step 94. In doing so tag engine 30 may generate or maintain range table 42 of FIG. 4. Range table 42 defines a sequential set of (n) ranges for example. A first of the distance ranges includes a smallest considered distance. The (nth) distance range includes the largest considered distance. Range table 42 associates each distance range with a different subset of the location tags. Step 94 can thus be accomplished by identifying, for each network resource, the distance range in which the determined distance between that network resource and the client device falls and selecting the subset of location tags associated with the identified distance range.

For each of the network resources, the client device is caused to display values for the subset of location tags selected for that network device (step 96). Step 96 can be implemented in a number of fashions. Step 96 can involve communicating data to the client device with at least implicit instructions that the data be used to cause the display. Step 96 can involve generating a user interface using such data. Step 96 can involve directly causing a display of the client device to present that user interface.

Referring to FIG. 2, display engine 32 may be responsible for implementing step 96. Looking at FIG. 3, table 34 includes, for a given network resource, values for each of a set of location tags. The values for the subset selected in step 94 can be retrieved from table 34. Step 96 can include assembling, for each network resource, a location string by concatenating the values for the subset of location tags selected for that network resource. Step 96 would then also include causing a display of the location string assembled for each of the network resources. The location string for each network resource when displayed may occupy a single line. Further, the location string may be part of or displayed with a control for selecting the corresponding network resource.

As noted, the location tags for each of the network devices span a range from most geographically coarse to most geographically fine. In processing the flow of FIG. 7, a first distance between the client device and a first network resource and a second distance between the client device and a second resource may be determined in step 92. In step 94, a first subset of location tags is selected for the first network resource, and a second subset is selected for the second network resource. Where the first and second distances differ, the first and second subsets may also differ. Where the second distance is greater than the first distance, the second subset of location tags may be more geographically coarse than the first subset of location tags.

CONCLUSION

The diagrams of FIGS. 1-6 show the architecture, functionality, and operation of various embodiments. Various components illustrated in FIG. 2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a flash drive, a hard drive, random access memory (RAM), read-only memory (ROM), erasable programmable read-only memory, a compact disc, and digital video disc.

Although the flow diagram of FIG. 7 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for locating network resources, comprising:
defining a sequential set of (n) distance ranges, a first of the distance ranges including a smallest considered distance and the (nth) distance range including a largest considered distance;
associating each distance range with a different subset of location tags of a plurality of location tags;
determining a distance between a client device and each of a plurality of network resources;
for each of the network resources, selecting a subset of the plurality of location tags for that network resource according to the distance between the client device and that network resource, wherein selecting comprises, for each network resource, identifying the distance range in which the determined distance between that network resource and the client device falls and selecting the subset of location tags associated with the identified distance range;
for each of the network resources, causing a display by the client device, of values for the subset of location tags selected for that network resource; and
wherein the display is a single display that identifies each of the plurality of network resources along with the values for the subset of location tags selected for each of the plurality of network resources, the values for a first one of the network resources being more geographically coarse than the values for a second one of the plurality of network resources.

2. The method of claim 1, wherein:
the plurality of location tags for each network resource span a range from most geographically coarse to most geographically fine;
determining comprises determining a first distance between the client device and a first network resource and a second distance between the client device and a second network resource, the second distance being greater than the first distance;
selecting comprises, selecting a first subset of location tags for the first network resource and selecting a second subset of tags for the second network resource, the second subset being more geographically coarse than the first subset.

3. The method of claim 2, wherein the value of a most geographically coarse location tag identifies a geographic territory and the value of a most geographically fine location tag identifies a position within that territory.

4. The method of claim 1, wherein causing a display by the client device comprises, for each network resource:
generating a location string according to the subset of location tags selected for that network resource; and
causing a display of the location string.

5. The method of claim 4, wherein generating comprises generating a location string by concatenating the values for the subset of location tags selected for that device.

6. The method of claim 4, wherein causing a display of the location string, comprises causing a display of the location string with or as part of a control for selecting the corresponding network service for performing a job.

7. The method of claim 4, wherein causing a display of the location string comprises causing a one line display of the location string.

8. A non-transitory processor readable medium storing instructions that when executed cause the implementation of a method for locating network resources, the method comprising:
defining a sequential set of (n) distance ranges, a first of the distance ranges including a smallest considered distance and the (nth) distance range including a largest considered distance;
associating each distance range with a different subset of location tags of a plurality of location tags;
determining a distance between a client device and each of a plurality of network resources;
for each of the network resources, selecting a subset of the plurality of location tags for that network resource according to the distance between the client device and that network resource, wherein selecting comprises, for each network resource, identifying the distance range in which the determined distance between that network resource and the client device falls and selecting the subset of location tags associated with the identified distance range;
for each of the network resources, causing a display by the client device, of values for the subset of location tags selected for that network resource;
wherein the display is a single display that identifies each of the plurality of network resources along with the values for the subset of location tags selected for each of the plurality of network resources, the values for a first one of the network resources being more geographically coarse than the values for a second one of the plurality of network resources.

9. The medium of claim 8, wherein:
the plurality of location tags for each network resource span a range from most geographically coarse to most geographically fine;
determining comprises determining a first distance between the client device and a first network resource and a second distance between the client device and a second network resource, the second distance being greater than the first distance;
selecting comprises, selecting a first subset of location tags for the first network resource and selecting a second subset of tags for the second network resource, the second subset being more geographically coarse than the first subset.

10. The medium of claim 9, wherein the most geographically coarse location tag identifies a geographic territory and the most geographically fine location tad identifies a position within that territory.

11. The medium of claim 8, wherein causing a display by the client device comprises, for each network resource:
generating a location string according to the subset of location tags selected for that network resource; and
causing a display of the location string.

12. The medium of claim 11, wherein causing a display of the location string comprises causing a one line display of the location string.

13. The medium of claim 11, wherein causing a display of the location string, comprises causing a display of the location string with or as part of a control for selecting the corresponding network service for performing a job.

14. The medium of claim 11, wherein generating comprises generating a location string by concatenating the values for the subset of location tags selected for that device.

15. A system for locating resources, comprising:
a distance engine configured to determine a distance between a client device and each of a plurality of network resources, define a sequential set of (n) distance ranges, a first of the distance ranges including a smallest considered distance and the (nth) distance range including a largest considered distance, and associate each distance range with a different subset of location tags;
a tag engine configured to, for each of the network resources, identify the distance range in which the determined distance between that network resource and the client device falls and select the subset of location tags associated with the identified distance range;
a display engine configured to, for each of the network resources, cause a display by the client device of values for the subset of location tags selected for that network resource;
wherein the display is a single display that identifies each of the plurality of network resources along with the values for the subset of location tags selected for each of the plurality of network resources, the values for a first one of the network resources being more geographically coarse than the values for a second one of the plurality of network resources.

16. The system of claim 15, wherein:
the plurality of location tags for each network resource span a range from most geographically coarse to most geographically fine;
the distance engine is configured to determine a first distance between the client device and a first network resource and a second distance between the client device and a second network resource, the second distance being greater than the first distance;
the tag engine is configured to select a first subset of location tags for the first network resource and select a second subset of tags for the second network resource, the second subset being more geographically coarse than the first subset.

17. The system of claim 15, wherein the display engine is configured to cause a display by the client device by:
generating a location string according to the subset of location tags selected for that network resource; and
causing a display of the location string.

* * * * *

UNITED STATES PATENT AND TRADEMARK OFFICE
CERTIFICATE OF CORRECTION

PATENT NO. : 8,468,240 B2
APPLICATION NO. : 12/881975
DATED : June 18, 2013
INVENTOR(S) : Rodrigo Prati et al.

Page 1 of 1

It is certified that error appears in the above-identified patent and that said Letters Patent is hereby corrected as shown below:

In the Claims:

In column 10, line 6, in Claim 10, delete "tad" and insert -- tag --, therefor.

Signed and Sealed this
Fifth Day of November, 2013

Teresa Stanek Rea
*Deputy Director of the United States Patent and Trademark Office*